May 7, 1929.  E. PIQUEREZ  1,711,905
LUBRICANT COMPRESSOR
Filed April 16, 1925
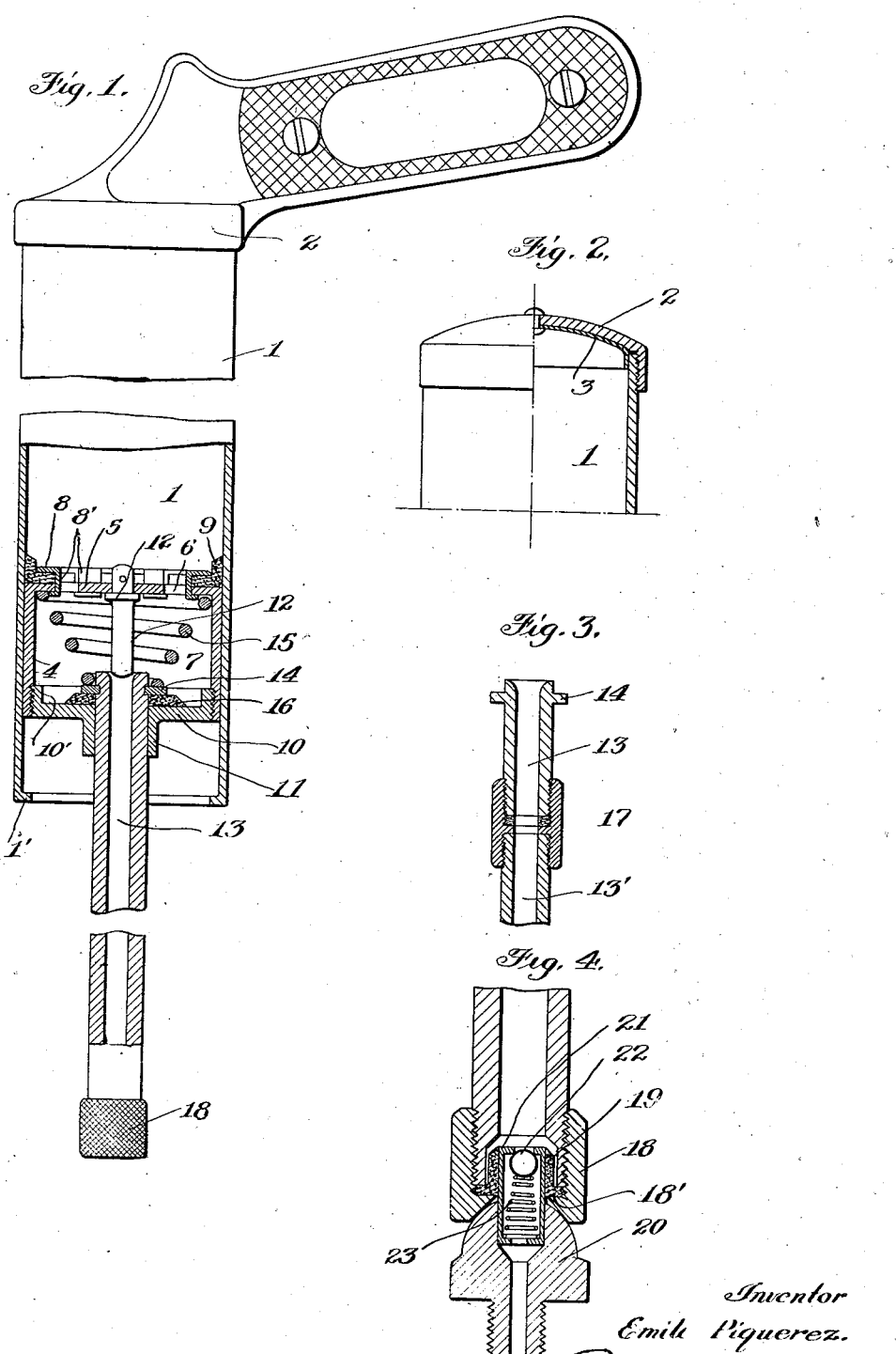

Patented May 7, 1929.

1,711,905

UNITED STATES PATENT OFFICE.

EMILE PIQUEREZ, OF PARIS, FRANCE, ASSIGNOR TO ALEMITE MANUFACTURING CORPORATION, OF CHICAGO, ILLINOIS, A CORPORATION OF DELAWARE.

LUBRICANT COMPRESSOR.

Application filed April 16, 1925, Serial No. 23,744, and in France November 12, 1924.

My invention relates to forced lubrication, and more specifically to a lubricant force pump operating at moderate pressure to deliver large quantities, but changing to a smaller delivery at high pressure by means of a piston coming into action automatically when the resistance to discharge reaches or exceeds a predetermined value.

The pump comprises primarily a lubricant reservoir slidable on a piston in the form of a double bottomed cylinder, the upper end being apertured and carrying the high pressure piston, and the lower end forming a complete barrier, but traversed by a fixed delivery tube on which the entire piston itself can slide. Inside the reservoir piston, a spring is employed, yielding of which spring results in a second compression of the lubricant by the high pressure piston fastened to the upper end.

The delivery tube of the pump is provided with a tight coupling to be connected to the lubricant fitting, the valve of which will control the delivery of lubricant from the pump.

In the accompanying drawings;

Fig. 1 is a longitudinal section.

Fig. 2 is a section of an alternative construction of the reservoir cover.

Fig. 3 shows in longitudinal section an alternative construction for the upper end of the delivery tube.

Fig. 4 is an enlarged longitudinal section of the lower end of the tube with the coupling in place on the fitting.

As shown in the drawings, the apparatus comprises a cylindrical lubricant reservoir 1 closed by a cover 2 lined on the inside with a piece 3 of the same shape, a gasket being slipped between the two parts to make a tight joint when the cover is screwed down on the body 1. (Fig. 2.) This cover, may if desired, be provided with a handle similar to that of a pistol (Fig. 1) which may be cast integral with the cover.

At its lower end the reservoir 1 has a simple annular lip 1' for an abutment for the inside parts when the reservoir is full. The piston comprises a cylindrical body 4 which is a sliding fit in the reservoir. The upper end 5 is apertured at 6 to connect reservoir 1 with chamber 7. These apertures receive vertical eyelets 8' struck out of a ring 8 holding a packing gasket 9 on top of cylinder 4, the eyelets 8' being riveted outward after assembly to permanently attach the parts together. The bottom of cylinder 4 is threaded and receives the flange 10' of the piston bottom 10 provided with a cylindrical boss 11 bored to fit the distribution tube 13.

The high pressure piston 12 is fastened in the upper end 5 of cylinder 4 as by means of an enlargement 12' and a cotter pin. This piston is set in alignment opposite the distribution tube 13, which tube also functions as a high pressure cylinder and carries a flange 14 fastened to the end thereof. A strong spring 15 presses on this flange, with its upper end bearing against the upper end 5 of piston 4. In the normal position shown in Fig. 1 spring 15 maintains a pressure on packing 16 between the flange 14 and the lower end 10 of the piston.

Flange 14 could be replaced as shown in Fig. 3 by an integral shoulder, tube 13 being, under such circumstances, provided with an extension 13' connected to it by a nipple 17 provided with a suitable packing.

The pump above described can advantageously be used in connection with a coupling 18 threaded to the end of the tube 13 and having an inner shoulder 18' on which the sleeve packing 19 rests, which packing extends up into an enlarged bore at the lower end of the tube 13. Between the sleeve 19 and the bore receiving it, there should be sufficient annular clearance to permit the lubricant to press with full strength on the sleeve to maintain a tight joint.

In the embodiment shown, the fitting comprises a spherical head 20 (Fig. 4) in which capsule 21 is a pressed fit. The capsule contains the valve 22 illustrated as a ball valve and its spring 23. The fitting structure disclosed is very cheap to manufacture.

The operation is as follows:

Assuming that the parts are in the position of Fig. 1 and the space above bottom 10 full of lubricant, force is exerted manually on the body 1 of the reservoir. This slides down over the piston 4 and the cover 2 confines the lubricant, which passes out through tube 13. When the resistance to flow offered by the parts to be lubricated overcomes the tension of the spring 15 the operator can increase the force applied and spring 15 will yield. Piston 12 thereupon automatically enters cylinder 13 and forces in the lubricant at high pressure. When the pressure is relieved, spring 15 will expand to bring the parts back to the normal position, and the apparatus is ready for further discharge in large volume at moderate pressure.

Without further elaboration, the foregoing will so fully explain the gist of the invention that others may, by applying current knowledge, readily adapt the same for use under various conditions of service, without eliminating certain features which may properly be said to constitute the essential items of novelty involved, which items are intended to be defined and secured by the following claim.

I claim:

In lubricating apparatus of the class described, a compressor having a lubricant reservoir, said reservoir being cylindrical throughout its length and provided at one end with an inturned flange, a cap detachably secured to the other end of said reservoir and provided with a laterally projecting handle for operating said compressor, a low pressure piston slidable axially of said reservoir and confined between said flange and said cap, high pressure compressing means carried by said piston, said means comprising a high pressure plunger and a reciprocable delivery tube telescopable therewith, spring means for separating said plunger and said tube, and gasket means clamped between said piston and said tube and normally receiving the thrust of said spring.

In witness whereof, I hereunto subscribe my name, this 23d day of March, 1925.

EMILE PIQUEREZ